(12) United States Patent
Kadowaki et al.

(10) Patent No.: US 8,524,839 B2
(45) Date of Patent: Sep. 3, 2013

(54) CURABLE RESIN COMPOSITION, TRANSPARENT LAMINATE, AND PROCESS FOR PRODUCING TRANSPARENT LAMINATE

(75) Inventors: Yoshinobu Kadowaki, Tokyo (JP); Satoshi Niiyama, Tokyo (JP); Naoko Aoki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/290,403

(22) Filed: Nov. 7, 2011

(65) Prior Publication Data

US 2012/0121914 A1 May 17, 2012

Related U.S. Application Data (63) Continuation of application No. PCT/JP2010/058460, filed on May 19, 2010.

(30) Foreign Application Priority Data

May 20, 2009 (JP) ................................ 2009-122194

(51) Int. Cl.
*C08F 283/12* (2006.01)
*C08G 59/02* (2006.01)

(52) U.S. Cl.
USPC ................ 525/455; 525/453; 528/76; 528/77

(58) Field of Classification Search
USPC .............................. 525/455, 453; 528/76, 77
See application file for complete search history.

(56) References Cited

U.S. PATENT DOCUMENTS

| | | | | | |
|---|---|---|---|---|---|
| 3,960,572 | A | * | 6/1976 | Ibata et al. | 430/283.1 |
| 4,116,786 | A | * | 9/1978 | Hodakowski | 522/91 |
| 4,263,366 | A | * | 4/1981 | Lorenz et al. | 428/332 |
| 5,475,038 | A | * | 12/1995 | Skoultchi | 522/96 |

(Continued)

FOREIGN PATENT DOCUMENTS

| JP | 2000-351827 | 12/2000 |
|---|---|---|
| JP | 2005-041747 | 2/2005 |

(Continued)

OTHER PUBLICATIONS

Machine Translation of JP 2006-219517.*

(Continued)

*Primary Examiner* — Mike M Dollinger
(74) *Attorney, Agent, or Firm* — Oblon, Spivak, McClelland, Maier & Neustadt, L.L.P.

(57) ABSTRACT

A transparent laminate having good transparency and good adhesion to transparent substrates, and containing a cured resin layer having excellent tear resistance. A process of producing a transparent laminate by interposing a curable resin composition containing an unsaturated urethane oligomer (A) which is a reaction product of a polyol component (A1) containing a polyol (a1) having from 2 to 3 hydroxy groups, a hydroxy value of 15 to 30 mgKOH/g and an oxyethylene group content of 8 to 50 mass %, a polyisocyanate (A2) and an unsaturated hydroxy compound (A3) or a reaction product of a polyol component (A1) and an unsaturated isocyanate (A4), and a monomer (B) represented by $CH_2=C(R)C(O)O-R^2$ (wherein R is a hydrogen atom or a methyl group, and $R^2$ is a $C_{3-4}$ hydroxyalkyl group having 1 to 2 hydroxy groups), between a pair of transparent substrates, and curing the curable resin composition.

18 Claims, 1 Drawing Sheet

(56) References Cited

U.S. PATENT DOCUMENTS 6,197,459 B1 * 3/2001 Leach ............................. 430/18
6,214,522 B1 * 4/2001 Leach ......................... 430/284.1
6,713,525 B2   3/2004 Kashiwame

FOREIGN PATENT DOCUMENTS

| JP | 2006-219517 | 8/2006 |
| JP | 2008-056757 | 3/2008 |
| WO | WO 2008/081838 | 7/2008 |
| WO | WO 2009/016943 | 2/2009 |

OTHER PUBLICATIONS

International Search Report issued Aug. 10, 2010 in PCT/JP2010/058460 filed May 19, 2010.

* cited by examiner

CURABLE RESIN COMPOSITION, TRANSPARENT LAMINATE, AND PROCESS FOR PRODUCING TRANSPARENT LAMINATE

TECHNICAL FIELD

The present invention relates to a curable resin composition suitable for a process for producing a transparent laminate by curing the curable resin composition interposed between a pair of transparent substrates, a transparent laminate having a layer of a cured resin made of a cured product of the curable resin composition, and a process for producing a transparent laminate by using the curable resin composition.

BACKGROUND ART

As a transparent laminate comprising a pair of transparent substrates and an adhesive resin layer interposed between the transparent substrates, laminated glass having a pair of glass plates integrated via an adhesive layer, has been known. The laminated glass is used as windshield glass for automobiles since it has a merit that broken glass fragments are adhered to the film-form adhesive resin layer without scattering. Further, the laminated glass is also used as window glass (safety glass or security glass) for buildings since it is hard to be penetrated and is excellent in the strength. Accordingly, an adhesive resin layer of the transparent laminate is required to have good adhesion to a transparent substrate and tear resistance, in addition to excellent transparency.

As a process for producing the laminated glass, the following processes have been known.

(1) A process for producing a laminated glass by interposing an adhesive resin film between a pair of transparent substrates, followed by press-bonding the resulting laminated product under heating.

(2) A process for producing a laminated glass by injecting a liquid-form curable resin between a pair of transparent substrates the periphery of which is sealed, followed by curing the curable resin (Patent Document 1).

As compared with the process (1), the process (2) has features that cured products having various physical properties can easily be obtained depending upon purposes since a wide variety of curable resins can be used, and that a production process can be simplified by using a readily curable resin (especially, a photocurable resin).

However, the process (2) has a drawback that bubbles tends to remain in the resin at the time of injecting the curable resin. As a method for preventing generation of the bubbles, a vacuum lamination method has been known. As a process for producing a laminated glass by means of the vacuum lamination method, for example, the following process has been known.

(3) A process for producing a laminated glass, comprising forming a layer of a photocurable resin composition on one transparent substrate and laminating the other transparent substrate on the layer of the photocurable resin composition under reduced pressure to seal the photocurable resin composition between a pair of transparent substrates, and then photocuring the photocurable resin composition under atmospheric pressure (Patent Document 2).

As a photocurable resin, a photocurable resin composition containing an unsaturated urethane oligomer has been proposed (Patent Document 1). Further, as a photocurable resin suitable for the vacuum lamination method, a photocurable resin composition containing an unsaturated urethane oligomer has been known (Patent Document 3).

PRIOR ART DOCUMENTS

Patent Documents

Patent Document 1: JP-A-2005-041747
Patent Document 2: WO08/081,838
Patent Document 3: WO09/016,943

DISCLOSURE OF INVENTION

Technical Problem

With respect to the above photocurable resin composition, by suitably designing a polyol component and a polyisocyanate as raw materials for an unsaturated urethane oligomer, it is possible to adjust the properties of a cured product. For example, by employing a polyol having a small hydroxy value (that is, a high molecular weight per a hydroxy group), it is possible to obtain a flexible cured product. Further, by further employing various monomers in combination with an unsaturated urethane oligomer, it is possible to further adjust the properties of a cured product.

However, if such a polyol having a small hydroxy value is employed, the compatibility between the resulting unsaturated urethane oligomer and monomers remarkably deteriorates, whereby the transparency of the cured product tends to be insufficient, or a haze value tends to be high. Further, the adhesion between a transparent substrate and a cured product tends to be insufficient.

Further, in order that a cured product has good tear resistance, the balance between the strength and the flexibility of the cured product is important. However, if a polyol having such a small hydroxy value (that is, a high molecular weight per hydroxy group) is employed, the number of crosslinking sites reduces, whereby the strength tends to be insufficient. On the other hand, if a polyol having a large hydroxy value (a low molecular weight per hydroxy group) is used, the flexibility is likely to be insufficient. Accordingly, it is difficult to design a polyol component to obtain a cured product excellent in the tear resistance.

It is an object of the present invention to provide a curable resin composition to obtain a cured product having good transparency, and excellent adhesion to a transparent substrate and tear resistance. Further, it is an object of the present invention to provide a curable resin composition to be employed for a process for producing a transparent laminate. Furthermore, it is an object of the present invention to provide a transparent laminate excellent in the adhesion between a transparent substrate and a layer of a cured resin and in the tear resistance of the layer of a cured resin, and a production process thereof.

Solution to Problem

The present invention is directed to the invention of the following [1] to [10].

[1] A curable resin composition comprising the following unsaturated urethane oligomer (A):

unsaturated urethane oligomer (A): an unsaturated urethane oligomer having from 2 to 4 curable functional groups as mentioned below, on average per molecule, which is a reaction product of the following polyol component (A1), a polyisocyanate (A2) and the following unsaturated hydroxy compound (A3), or a reaction product of the following polyol component (A1) and an unsaturated isocyanate (A4) having the following curable functional group, polyol component (A1): a polyol component containing the following polyol (a1), polyol (a1): a polyoxyalkylene polyol having a hydroxy value of from 15 to 30 mgKOH/g and an oxyethylene group content of from 8 to 50 mass % in the total oxyalkylene groups of 100 mass %, which is obtained by reacting a monoepoxide having at least three carbon atoms and ethylene oxide with an initiator having from 2 to 4 active hydrogen atoms on average, unsaturated hydroxy compound (A3): a compound having the following curable functional group and a hydroxy group, and curable functional group: a group represented by $CH_2=C(R)C(O)O-$ (wherein R is a hydrogen atom or a methyl group.)

[2] The curable resin composition according to the above [1], wherein the polyol (a1) is a polyoxyalkylene polyol having a hydroxy value of from 15 to 30 mgKOH/g and an oxyethylene group content of from 8 to 50 mass % in the total oxyalkylene groups of 100 mass %, which is obtained by reacting propylene oxide and ethylene oxide with an initiator having from 2 to 4 active hydrogen atoms on average.

[3] The curable resin composition according the above [1] or [2], which further contains the following monomer (B):

Monomer (B): a compound represented by $CH_2=C(R)C(O)O-R^2$ (wherein R is a hydrogen atom or a methyl group, and $R^2$ is a $C_{3-8}$ hydroxyalkyl group having from 1 to 2 hydroxy groups.)

[4] The curable resin composition according to any one of the above [1] to [3], which is a curable resin composition to be used for a process for producing a transparent laminate by curing the curable resin composition interposed between a pair of transparent substrates.

[5] The curable resin composition according to the above [4], which further contains the following monomer (C):

Monomer (C): a compound represented by $CH_2=C(R)C(O)O-R^3$ (wherein R is a hydrogen atom or a methyl group, and $R^3$ is a $C_{8-22}$ alkyl group.)

[6] The curable resin composition according to the above [4] or [5], which further contains a photopolymerization initiator (D).

[7] A transparent laminate comprising a pair of transparent substrates and a layer of a cured resin interposed between the pair of transparent substrates, wherein the cured resin is a cured product of the curable resin composition as defined in any one of the above [4] to [6].

[8] A process for producing a transparent laminate, comprising a first step of forming a sealed space having the curable resin composition as defined in any one of the above [4] to [6], internally accommodated between a pair of transparent substrates in a reduced pressure atmosphere, to produce a laminate precursor having the pair of transparent substrates and the above curable resin composition sealed between the pair of transparent substrates, and a second step of placing the above laminate precursor in an atmosphere having a pressure higher than the reduced pressure atmosphere, and curing the curable resin composition in the atmosphere.

[9] The process according to the above [8], wherein the above reduced pressure atmosphere is a pressure atmosphere of at most 100 Pa, and the atmosphere having a pressure higher than the reduced pressure atmosphere is an atmospheric pressure atmosphere.

[10] The process according to the above [8] or [9], wherein the curable resin composition is a photocurable resin composition, and the curable resin composition is cured by irradiating the laminate precursor with light in the second step.

Advantageous Effects of Invention

According to the curable resin composition of the present invention, it is possible to obtain a cured product having good transparency, and excellent adhesion to a transparent substrate and tear resistance.

The transparent laminate of the present invention has good transparency, and excellent adhesion between a transparent substrate and a layer of a cured resin and excellent tear resistance of the layer of a cured resin.

According to the process for producing a transparent laminate of the present invention, it is possible to produce a transparent laminate having good transparency, and excellent adhesion between a transparent substrate and a layer of a cured resin and excellent tear resistance of the layer of a cured resin.

DESCRIPTION OF EMBODIMENTS

The curable functional group represented by $CH_2=C(R)C(O)O-$ (wherein R is a hydrogen atom or a methyl group) in this specification is an acryloyloxy group (when R is a hydrogen atom) or a methacryloyloxy group (when R is a methyl group), and hereinafter, the group represented by the formula will be also referred to as a (meth)acryloyloxy group. Likewise, "(meth)acrylate" is used as a general term for "acrylate" and "methacrylate".

<Curable Resin Composition>

The curable resin composition of the present invention is a curable resin composition containing an unsaturated urethane oligomer (A), which is suitable as a curable resin composition to be used for a process for producing a transparent laminate by curing the curable resin composition interposed between a pair of transparent substrates.

(Unsaturated Urethane Oligomer (A))

The unsaturated urethane oligomer (A) is an unsaturated urethane oligomer having from 2 to 4 curable functional groups on average per molecule, which is a reaction product of a polyol component (A1), a polyisocyanate (A2) and an unsaturated hydroxy compound (A3), or a reaction product of the polyol component (A1) and an isocyanate compound (A4) having a curable functional group. Hereinafter, the unsaturated urethane oligomer (A) will be also referred to as an oligomer (A).

The unsaturated urethane oligomer (A) has from 2 to 4 curable functional groups (that is, (meth)acryloyloxy groups) on average per molecule. A plurality of the curable functional groups being present in one molecule may be different (that is, an acryloyloxy group and a methacryloyloxy group may be present in one molecule). However, usually, the plurality of the curable functional groups in one molecule are preferably the same functional groups, and the curable functional groups in the oligomer (A) are preferably acryloyloxy groups. The reactivity of the curable functional group in the oligomer (A) tends to be low since the molecular weight of the oligomer (A) is high, and in a case where a relatively low-molecular weight monomer is used in combination, it is preferred that the reactivity of the curable functional group in the oligomer (A) is high in order to reduce the difference in reactivity between the curable functional groups of them. Therefore, the curable functional groups of the oligomer (A) are preferably acryloyloxy groups having a reactivity higher than the methacryloyloxy groups.

The number of curable functional groups of the oligomer (A) on average per molecule is from 2 to 4, and preferably 2 to 3. When the number of curable functional groups of the oligomer (A) on average per molecule is at least two, a cured product is less likely to deform when exposed to a high temperature. In a case where the number of curable functional groups of the oligomer (A) on average per molecule is at most 4, the cured product is less likely to be brittle.

The number of curable functional groups of the oligomer (A) on average per molecule is adjusted by the number of hydroxy groups in the polyol component (A1), the number of isocyanate groups of the polyisocyanate (A2), the number of curable functional groups and the number of hydroxy groups in the unsaturated hydroxy compound (A3), and the number of curable functional groups and the number of isocyanate groups in the unsaturated isocyanate (A4) having a curable functional group, as mentioned below. From the viewpoints that a diisocyanate having two isocyanate groups is preferred as the polyisocyanate (A2), that an unsaturated monool having one curable functional group is preferred as the unsaturated hydroxy compound (A3), and that an unsaturated monoisocyanate having one curable functional group and one isocyanate group is preferred as the unsaturated isocyanate compound (A4), the number of the curable functional groups on average per molecule of the oligomer (A) obtainable by employing them is usually almost the same as the number of hydroxy groups on average per molecule of the polyol component (A1). For example, by employing only a diol as the polyol component (A1), it is possible to obtain the oligomer (A) having two curable functional groups on average per molecule. Likewise, by employing a diol and a triol as the polyol component (A1), it is possible to obtain the oligomer (A) having from 2 to 3 curable functional groups on average, and by employing only a triol as the polyol component (A1), it is possible to obtain the oligomer (A) having 3 curable functional groups on average.

The oligomer (A) is a reaction product of the above three raw material compounds or a reaction product of the above two raw material compounds, and as a method for obtaining such a reaction product, the following methods (1) to (4) may, for example, be mentioned.

(1) A method of reacting the polyol component (A1), the polyisocyanate (A2) and the unsaturated hydroxy compound (A3) all at once.

(2) A method of reacting the polyisocyanate (A2) and the unsaturated hydroxy compound (A3) under the conditions where the amount of isocyanate groups is stoichiometrically in excess, and further reacting the polyol component (A1) with the resulting reaction product.

(3) A method of reacting the polyol component (A1) with the polyisocyanate (A2) under the conditions where the amount of isocyanate groups is stoichiometrically in excess, and further reacting the unsaturated hydroxy compound (A3) with the resulting reaction product.

(4) A method of reacting the polyol component (A1) with the unsaturated isocyanate (A4) under the conditions where their amounts are stoichiometrically equivalent or the amount of hydroxy groups is in excess (provided that the proportion of the curable functional group of the reaction product is from 2 to 4 on average).

As a method (3), a process comprising the following step (3-1) and step (3-2) may be mentioned.

(3-1) A step of reacting the polyol component (A1) with the polyisocyanate (A1) under conditions where the amount of isocyanate groups is stoichiometrically in excess, in the presence of a urethane-forming catalyst as the case requires, to obtain an isocyanate group terminal urethane prepolymer.

(3-2) A step of reacting an unsaturated hydroxy compound (A3) with isocyanate groups at the terminals of the urethane prepolymer in the presence of a polymerization inhibitor as the case requires.

Step (3-1):

As a urethane-forming catalyst, cobalt naphthenate, zinc naphthenate, zinc 2-ethylhexanoate, dibutyl tin dilaurate, tin 2-ethylhexanoate, triethylamine or 1,4-diabicyclo[2.2.2]octane may, for example, be mentioned.

The proportion of the polyol component (A1) to the polyisocyanate (A2) is preferably from 1.2:1 to 3:1, more preferably from 1.2:1 to 2:1 as a molar ratio of isocyanate group: hydroxy group. The reaction temperature is preferably a temperature in a usual urethane-forming reaction, that is from 30 to 90° C.

Step (3-2):

As a polymerization inhibitor, hydroquinone, hydroquinone monomethyl ether, 2,6-di-tert-butyl-hydroquinone or o-nitrotoluene may, for example be mentioned. The amount of the polymerization inhibitor is preferably from 50 to 5,000 ppm to the unsaturated hydroxy compound (A3).

The proportion of a urethane prepolymer to the unsaturated hydroxy compound (A3) is preferably from 1:1 to 1:1.5 as a molar ratio of isocyanate group: hydroxy group. The reaction temperature is prepared from 30 to 90° C.

As the method (1), it is possible to obtain an oligomer (A) as a desired product, but fluctuation is likely to be observed in molecular weight of the desired product or the viscosity of the oligomer (A). Such a method is easy, but is hardly applicable as an industrial method.

In the method (2), an ultra high molecular weight product (gel component) is hardly produced in a case where the number of hydroxy groups of the polyol component (A1) is at least 3. Also in the present invention, this method was employed in a case where the number of hydroxy groups of the polyol component (A) is at least 3.

In the method (3), it is possible to obtain a qualitative oligomer (A) steadily, and therefore the method (3) is industrially preferred.

In the method (4), it is possible to obtain the oligomer (A) in one step synthesis.

This method is preferred when it is possible to industrially easily obtain the unsaturated isocyanate (A4).

(Polyol Component (A1))

The polyol component (A1) is a polyol component comprising a polyol (a1) or a polyol component containing the polyol (a1) and another polyol (a2).

(Polyol (a1))

The polyol (a1) is a polyoxyalkylene polyol having a hydroxy value of from 15 to 30 mgKOH/g and an oxyethylene group content of from 8 to 50 mass % in the total oxyalkylene groups of 100 mass %, which is obtained by reacting a monoepoxide having at least 3 carbon atoms and ethylene oxide with an initiator having from 2 to 4 active hydrogen atoms on average.

The polyol (a1) is a polyol having a polyoxyalkylene chain made of an oxyalkylene group having at least 3 carbon atoms, and an oxyethylene group, and a polyoxyalkylene polyol obtainable by reacting a monoepoxide to an initiator in the preference of a catalyst is preferred. The polyol (a1) may be used alone or in combination as a mixture of two or more of them.

As a catalyst, diethyl zinc, zinc chloride, metal porphyrin, a double metal cyanide complex, a cesium compound or an alkali (earth) metal compound may, for example, be mentioned, an alkali metal compound catalyst or a double metal cyanide complex is preferred, and a double metal cyanide complex is particularly preferred. When a polyoxyalkylene polyol having a low hydroxy value is obtained by reacting propylene oxide in the presence of a general purpose alkali metal compound catalyst (such as potassium hydroxide), isomerization reaction of propylene oxide readily proceeds, whereby the unsaturation degree becomes high. A cured product containing the oligomer (A) obtainable by using a polyoxyalkylene polyol having a high unsaturation degree tends to be insufficient in the mechanically properties. The unstauration degree (USV) of the polyol (a1) is preferably at most 0.05.

Accordingly, in order to produce the polyol (a1) having a low hydroxy value, it is preferred to use a double metal cyanide complex catalyst. However, it is difficult to react ethylene oxide alone in the presence of the double metal cyanide complex catalyst. Accordingly, in the case of producing a block copolymer type polyoxyalkylene polyol, it is preferred to react a monoepoxide having at least 3 carbon atoms in the presence of a double metal cyanide complex catalyst and then react ethylene oxide in the presence of another catalyst.

As the double metal cyanide complex catalyst, a complex having zinc hexacyanocobaltate as a main component is preferred, and an ether and/or alcohol complex of zinc hexacyanocobaltate is particularly preferred. As the ether and/or alcohol complex of zinc hexacyanocobaltate, one disclosed in JP-B-46-27250 is mentioned. Such an ether is preferably e.g. ethylene glycol, dimethyl ether (glyme) or diethylene glycol dimethyl ether, and particularly preferably glyme from the viewpoint of handling efficiency at the time of producing the complex. Such an alcohol is preferably e.g. tert-butanol or tert-butylcellosolve.

An initiator has active hydrogen atoms on average of from 2 to 4, more preferably from 2 to 3. The active hydrogen atom is an active hydrogen atom with which a monoepoxide can react, such as a hydrogen atom of a hydroxy group or a hydrogen atom of an amino group. The active hydrogen is preferably a hydrogen atom of a hydroxy group. Accordingly, the initiator is preferably a polyhydroxy compound having from 2 to 4 hydroxy groups on average, more preferably a polyhydroxy compound having from 2 to 3 hydroxy groups on average. The initiator may be, for example, be ethylene glycol, diethylene glycol, propylene glycol, dipropylene glycol, neopentyl glycol, 1,4-butanediol, 1,6-hexanediol, glycerin, trimethylolpropane, pentaerythritol, or a polyoxyalkylene polyol having a molecular weight lower than the polyol (a1), which is obtainable by reacting an alkylene oxide therewith. In the case of using a double metal cyanide complex catalyst, the molecular weight of the initiator is preferably from 500 to 1,500, and particularly preferred is polyoxypropylene polyol having a molecular weight of from 500 to 1,500 which is obtainable by reacting propylene oxide with a dihydric to tetrahydric polyhydric alcohol. The initiator may be used alone or in combination as a mixture of two or more of them.

A monoepoxide is a compound having one epoxy ring. As a monoepoxide, a monoepoxide having at least 3 carbon atoms or ethylene oxide is used. As the monoepoxide, an alkylene oxide, glycidyl ether or glycidyl ester may, for example, be mentioned, and alkylene oxide is preferred. As the alkylene oxide having at least 3 carbon atoms, propylene oxide, 1,2-butylene oxide, 2,3-butylene oxide or styrene oxide may, for example, be mentioned, and propylene oxide is preferred. In a case where the polyol (a1) is produced by using ethylene oxide and propylene oxide, a monoepoxide other than them may be used in combination.

As the polyol (a1) obtainable by reacting ethylene oxide and a monoepoxide having at least 3 carbon atoms (hereinafter, propylene oxide is represented) with an initiator in the presence of a catalyst, one obtainable by reacting a mixture of ethylene oxide and propylene oxide with an initiator, one obtainable by separately reacting ethylene oxide and propylene oxide with an initiator in order, or one obtainable by separately reacting a mixture of ethylene oxide and propylene oxide, and propylene oxide (or ethylene oxide), with an initiator in order may, for example, be mentioned. A polyoxyalkylene chain formed from a mixture of ethylene oxide and propylene oxide is a random copolymer chain of an oxyethylene group and an oxypropylene group, and a polyoxyalkylene chain formed by separately reacting ethylene oxide and propylene oxide in order, is a block copolymer chain having a polyoxyethylene chain and a polyoxypropylene chain bonded with each other. The polyol (a1) is preferably a block copolymer type polyoxyalkylene polyol obtainable by reacting propylene oxide with an initiator and then reacting ethylene oxide, or a random copolymer type polyoxyalkylene polyol obtainable by reacting a mixture of propylene oxide and ethylene oxide with an initiator, and the former block copolymer type polyoxyalkylene polyol is particularly preferred.

The number of hydroxy groups on average per molecule of the polyol (a1) is from 2 to 4, preferably from 2 to 3. When the number of hydroxy groups on average per molecule of the polyol (a1) is from 2 to 4, preferably from 2 to 3. When the number of the hydroxy groups on average per molecule of the polyol (a1) is from 2 to 4, the oligomer (A) having from 2 to 4 curable functional groups on average per molecule is easily obtainable.

The number of hydroxy groups on average per molecule of the polyol (a1) is equal to the number of active hydrogen atoms per molecule of an initiator when the initiator is one type, and when the initiator is a mixture of two types, an average value of the numbers of active hydrogen atoms per molecule of initiators in the mixture.

The hydroxy value of the polyol (a1) is from 15 to 30 mgKOH/g. When the hydroxy value of the polyol (a1) is at least 15 mgKOH/g, the strength of a cured product will be good. Further, since the molecular weight of the polyol (a1) is not too large, the viscosity of the polyol (a1) does not become too high, and therefore there are no problems in workability. When the hydroxy value of the polyol (a1) is at most 30 mgKOH/g, it is possible to maintain high flexibility of a cured product.

The hydroxy value of the polyol (a1) is measured in accordance with JIS K1557-1 (2007). The same also applies to the hydroxy value of other polyols.

The oxyethylene group content in the polyol (a1) is from 8 to 50 mass % in the total oxyalkylene groups of 100 mass %. When the oxyethylene group content is at least 8 mass %, the compatibility between the oligomer (A) and a monomer component such as the monomer (B) will be good, whereby the transparency of the cured product will be good. When the oxyethylene group content is at most 50 mass %, intermolecular crystallinity will be weaken, whereby a liquid state is shown at normal temperature, and therefore handling efficiency becomes good and there are no problems in workability.

It is possible to calculate the oxyethylene group content from peaks of $^1$H-NMR (nuclear magnetic resonance) spectrum.

(Polyol (a2))

The polyol (a2) is a polyol other than the polyol (a1). The polyol (a2) may, for example, be a polyoxyalkylene polyol having no oxyethylene groups, a polyoxyalkylene polyol having at least 5 hydroxy groups on average, or a polyoxyalkylene polyol having a hydroxy value exceeding 30 mgKOH/g.

When the polyol component (A1) contains the polyol (a2), the proportion of the polyol (a2) to the polyol component (A1) is preferably less than 30 mass %, more preferably less than 20 mass %. When the proportion of the polyol (a2) is less than 30 mass %, high transparency and flexibility of a cured product are maintained.

(Polyisocyanate (A2))

The polyisocyanate (A2) may, for example, be an alicyclic polyisocyanate, an aliphatic polyisocyanate, an aliphatic polyisocyanate containing an aromatic ring, or a modified polyisocyanate obtainable by modification thereof, having at least two isocyanate groups on average per molecule. It is preferred not to use an aromatic polyisocyanate having isocyanate groups bonded to an aromatic ring, since a cured resin is likely to be yellowed.

The number of isocyanate groups on average per molecule of the polyisocyanate (A2) is preferably from 2 to 4, particularly preferably 2. That is, the polyisocyanate (A2) is preferably diisocyanate. The polyisocyanate (A2) may be used alone or in combination as a mixture of two or more of them.

As a specific example of the polyisocyanate (A2), an isocyanate such as isophorone diisocyanate, dicyclohexylmethane diisocyanate, hexamethylene diisocyanate or xylene diisocyanate, or a prepolymer modified product, a nurate modified product, a urea modified product or a carbodiimide modified product of the diisocyanate, may, for example, be mentioned, and isophorone diisocyanate or hexamethylene diisocyanate is particularly preferred.

(Unsaturated Hydroxy Compound (A3))

The unsaturated hydroxy compound (A3) is a compound having a curable functional group and a hydroxy group, in which at least two curable functional groups may be present per molecule or at least two hydroxy groups may be present per molecule. In order to produce the oligomer (A) having from 2 to 4 curable functional groups on average, a compound having one curable functional group and one hydroxy group per molecule is preferred.

The unsaturated hydroxy compound (A3) is preferably a compound represented by $CH_2=C(R)C(O)O-R^4-OH$ (wherein R is a hydrogen atom or a methyl group, and $R^4$ is a $C_{2-12}$ alkylene group). $R^4$ is preferably a $C_{2-8}$ alkylene group, more preferably a $C_{2-4}$ alkylene group. In order to obtain the oligomer (A) having high reactivity, it is preferred that the curable functional group is an acryloyloxy group (R is a hydrogen atom). Accordingly, the unsaturated hydroxy compound (A3) is more preferably a hydroxyalkyl acrylate having hydroxyalkyl having from 2 to 4 carbon atoms.

As a specific example of the unsaturated hydroxy compound (A3), 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, pentanediol mono(meth)acrylate or hexanediol mono(meth)acrylate may, for example, be mentioned, 2-hydroxyethyl (meth)acrylate or 2-hydroxypropyl (meth)acrylate is preferred, and 2-hydroxyethyl acrylate or 2-hydroxypropyl acrylate is particularly preferred. The unsaturated hydroxy compound (A3) may be used alone or in combination as a mixture of two or more of them.

(Unsaturated Isocyanate (A4))

The unsaturated isocyanate (A4) is a compound having a curable functional group and an isocyanate group, in which at least two curable functional groups may be present per molecule or at least two isocyanate groups may be present per molecule. In order to produce the oligomer (A) having from 2 to 4 curable functional groups on average, preferred is a compound having one curable functional group and one isocyanate group per molecule.

As the unsaturated isocyanate (A4), a compound represented by $CH_2=C(R)C(O)O-R^5-NCO$ (wherein R is a hydrogen atom or a methyl group, and $R^5$ is a $C_{1-6}$ alkylene group) is particularly preferred. In order to obtain the oligomer (A) having high reactivity, R is preferably a hydrogen atom. Further, $R^5$ is preferably a $C_{1-4}$ alkylene group, more preferably a $C_{1-2}$ alkylene group. The unsaturated isocyanate compound (A4) may be used alone or in combination as a mixture of two or more of them.

(Other Components)

A curable resin composition containing the unsaturated urethane oligomer (A) may be used for an adhesive, a coating agent or other applications. To the curable resin composition, various additives may be added depending upon the applications. It is usually essential to blend a curing agent for curing the curable resin composition, and as a curing agent, a radical generator or a photopolymerization initiator is preferred. A curable resin composition blended with a curing agent which generates radicals by the heat is a thermal curable type, and a curable resin composition blended with a photopolymerization initiator is a photocurable type.

It is preferred that a monomer such as a monomer (B) or other monomer (F) as mentioned below is blended with the curable resin composition containing the unsaturated urethane oligomer (A), for adjusting the physical properties of a cured product. As the monomer, a compound having from 1 to 6 curable functional groups is preferred, and a compound having from 1 to 2 curable functional groups is more preferred. In order to obtain a rigid cured product, a compound having from 3 to 6 curable functional groups is preferred. Further, in order to increase the coating property of the curable resin composition, a compound with a low viscosity is preferred as a monomer. A monomer having such a low viscosity will be also referred to as a reactive diluent. Further, a curable compound other than the above monomers such as other oligomer (E) as mentioned below, may also be blended therewith.

Various additives which are inert to the reaction, may be blended with the curable resin composition. The additive may, for example, be an additive (G) as mentioned below. Further, in order to increase the coating property, a solvent may also be employed as a component other than the components constituting the curable resin composition. The solvent is employed to apply the curable resin composition, and thereafter the solvent is removed and the curable resin composition is cured. However, in the case of a curable resin composition suitable for production of the after-mentioned transparent laminate, it is undesirable to use a volatile component, and therefore no solvent is employed.

(Curable Resin Composition Suitable for Production of Transparent Laminate)

The curable resin composition of the present invention to be used in a process for producing a transparent laminate by curing the curable resin composition interposed between a pair of transparent substrates, comprises the oligomer (A) and the monomer (B) as essential components, preferably further contains the monomer (C) and/or the photopolymerization initiator (D), and as the case requires, it may further contain e.g. other oligomer (E), other monomer (F) or the additive (G).

The proportion of the oligomer (A) is preferably from 20 to 75 mass %, more preferably from 40 to 60 mass %, per 100 mass % of the curable resin composition. When the proportion of the oligomer (A) is at least 20 mass %, a cured product hardly undergoes deformation even when a cured product is exposed to a high temperature. When the proportion of the oligomer (A) is at most 75 mass %, the cured product is hardly brittle.

The proportion of the monomer (B) is preferably from 25 to 65 mass %, more preferably from 35 to 50 mass %, per 100 mass % of the curable resin composition. When the proportion of the monomer (B) is at least 25 mass %, a cured product has good adhesion to the transparent substrates and tear resistance.

In a case where the monomer (C) is contained, its proportion is preferably from 3 to 50 mass %, more preferably from 5 to 25 mass % per 100 mass % of the curable resin composition. When the proportion of the monomer (C) is at least 3 mass %, a cured product has good flexibility.

In a case where the photopolymerization initiator (D) is contained, its amount is preferably from 0.01 to 10 parts by mass, more preferably from 0.1 to 2.5 parts by mass, per 100 parts by mass of the oligomer (A).

The proportion of other components (total of other oligomer (E), other monomer (F), the additive (G), etc.) is preferably at most 10 mass %, more preferably at most 5 mass %, per 100 mass % of the curable resin composition.

(Monomer (B))

The monomer (B) is a compound represented by $CH_2=C(R)C(O)O-R^2$ (wherein R is a hydrogen atom or a methyl group, and $R^2$ is a $C_{3-8}$ hydroxyalkyl group having from 1 to 2 hydroxy groups). The monomer (B) is effective as a component to improve the compatibility between the cured product and the surface of the transparent substrate (glass plate) by increasing the hydrophilicity of the cured product of the curable composition, and by employing such a monomer (B), the adhesion between the cured product and the transparent substrate is improved. Further, the strength of the cured product is also improved.

The monomer (B) is a (meth)acrylate having a hydroxyalkyl group or a dihydroxyalkyl group, and in order that the reaction with the oligomer (A) uniformly to proceeds, methacrylate is preferred. That is, even when the curable functional group in the oligomer (A) is an acryloyloxy group, the reactivity is low, and if the curable functional group in the monomer (B) is an acryloyloxy group, both the curable functional groups have a large difference in reactivity, whereby uniform curing may not be achieved. Accordingly, preferred is a combination of the oligomer (A) in which the curable functional group is an acryloyloxy group and the monomer (B) in which the curable functional group is a methacryloyloxy group. The monomer (B) may be used alone or in combination as a mixture of two or more of them.

If the number of hydroxy groups in the monomer (B) exceeds 2, the cured product has higher hydrophilicity, but becomes harder, and therefore it tends to be brittle. Accordingly, the number of hydroxy groups of $R^2$ is from 1 to 2, more preferably 1.

If the number of carbon atoms in $R^2$ is less than 3, the density of hydroxy groups tends to be high, and in a case where a curable resin composition is obtained by combination with the oligomer (A) having a long chain structure, phase separation tends to partly occur in the procedure of the curing reaction, whereby the haze tends to occur in the cured product, and therefore the transparency tends to deteriorate. If the number of carbon atoms in $R^2$ exceeds 8, there is a case where the density of the hydroxy groups is lowered, whereby no adequate adhesion is obtained. Accordingly, the number of carbon atoms in $R^2$ is from 3 to 8, preferably from 3 to 6.

The monomer (B) may, for example, be 2-hydroxypropyl methacrylate, 2-hydroxybutyl methacrylate, 4-hydroxybutyl methacrylate or 6-hydroxyhexyl methacrylate, and is preferably 2-hydroxybutyl methacrylate.

(Monomer (C))

The monomer (C) is a compound represented by $CH_2=C(R)C(O)O-R^3$ (wherein R is a hydrogen atom or a methyl group, and $R^3$ is a $C_{8-22}$ alkyl group). In the same reason as in the monomer (B), the monomer (C) is preferably a methacrylate, but from the reason that the monomer (C) has a higher molecular weight than the monomer (B), the monomer (C) may be an acrylate as the case requires. The monomer (C) may be used alone or in combination as a mixture of two or more of them.

When the curable resin composition contains the monomer (C), the elastic modulus of the cured product is lowered, whereby the tear resistance tends to be improved. Further, when the number of carbon atoms in the alkyl group is at least 8, the volatility tends to be low, and further it is possible to lower the glass transition temperature of the cured product. When the number of carbon atoms in the alkyl group is at most 22, the alcohol component as the raw material can readily be available from a natural product, and thus is more industrially useful.

The monomer (C) may, for example, be n-dodecyl methacrylate, n-octadecyl methacrylate or n-behenyl methacrylate, and is particularly preferably n-dodecyl methacrylate or n-octadecyl methacrylate is particularly preferred.

(Photopolymerization Initiator (D))

When the curable resin composition of the present invention contains the photopolymerization initiator (D), the photocurable resin composition is formed.

As the photopolymerization initiator (D), it is preferred to use one which is excited and activated by irradiation with visible light or ultraviolet light (at a wavelength of from 300 to 400 nm) to accelerate the curing reaction, and a benzoin ether type photopolymerization initiator, an α-hydroxyalkylphenone type photopolymerization initiator or an acylphosphine oxide type photopolymerization initiator may, for example, be mentioned.

As a specific example of the photopolymerization initiator (D), benzophenone, 4-chlorobenzophenone, 4,4'-dimethoxybenzophenone, 4,4'-diaminobenzophenone, acetophenone, 3-methylacetophenone, benzoyl, benzoin isobutyl ether, benzoin isopropyl ether, benzoin ethyl ether, anthraquinone, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, bis(2,4,6-trimethylbenzoyl)-phenylphosphine oxide may, for example, be mentioned, 1-hydroxycyclohexyl phenyl ketone, 1-[4-(2-hydroxyethoxy)-phenyl]-2-hydroxy-2-methyl-1-propan-1-one, bis(2,4,6-trimethylbenzoyl)-phenylphosphine oxide or the like is preferred, and an acylphosphine oxide type photopolymerization initiator such as bis(2,4,6-trimethylbenzoyl)-phenylphosphine oxide is particularly preferred since it is possible to sufficiently cure the curable resin composition even when the photopolymerization initiator is added in a trace amount. The photopolymerization initiator (D) may be used alone or in combination as a mixture of two or more of them.

(Other Oligomer (E))

The curable resin composition of the present invention may contain a small amount of other oligomer (E) other than the oligomer (A) for the purpose of adjusting the physical properties of the cured product obtainable.

Such other monomer (E) may, for example, be a urethane (meth)acrylate oligomer obtainable by employing a polyol other than the polyol compound (A1), a poly(meth)acrylate of a polyoxyalkylene polyol or a poly(meth)acrylate of a polyester polyol.

(Other Monomer (F))

The curable resin composition of the present invention may also contain a small amount of other monomer (F) (such as a (meth)acrylate) other than the monomer (B) and the monomer (C) for the purpose of adjusting the physical properties of the cured product obtainable. Such other monomer (F) may, for example, be a poly(meth)acrylate of a polyhydric alcohol.

However, in a case where a transparent laminate is produced by the vacuum lamination method as mentioned below, it is undesirable that the curable resin composition contains a low-boiling point compound. In the method of injecting a liquid-form curable resin composition between a pair of transparent substrates the periphery of which is sealed and curing the resin composition, even when the injection is carried out under reduced pressure of the space between the transparent substrates, the surface area of the curable resin composition exposed to the reduced pressure at the time of the injection is narrow, further, it is not necessary to increase the reduced pressure degree so much, and therefore even when the curable resin composition contains a relatively low-boiling point compound, its volatilization is not so problematic. On the other hand, in the vacuum lamination method, the curable resin composition exposed to the reduced pressure under such conditions that it is spread over almost the entire surface excluding the peripheral portion of the transparent substrate, and therefore if the curable resin composition contains a low-boiling point compound, the loss due to the volatilization is significant, whereby the composition of the curable resin composition tends to greatly change. In addition, due to the volatilization of the volatile compound, it becomes difficult to maintain the reduced pressure atmosphere with a required reduced pressure degree.

In the curable resin composition, a component which tends to have a low boiling point is mainly a monomer. The monomer (B) is a hydroxyalkyl (meth)acrylate and has a sufficiently high boiling point. Further, even though the monomer (C) is an alkyl (meth)acrylate, it has a high boiling point since its alkyl group has a large number of carbon atoms. An alkyl (meth)acrylate with an alkyl group having a small number of carbon atoms tends to have a low boiling point, and a curable resin composition containing such an alkyl(meth)acrylate having a low boiling point, as other monomer (F), cannot be used as a curable resin composition for producing a transparent laminate by the vacuum lamination method. It is preferred that a curable resin composition which can be used in the vacuum lamination method contains no monomer having a boiling point of at most 150° C., preferably at most 200° C. under a normal pressure.

(Additive (G))

As the additive (G), a ultraviolet light absorber (such as benzotriazole type or a hydroxyphenyltriazine type), a photostabilizer (such as hindered amine type), a pigment, a colorant, metal oxide particles or a filler may, for example, be mentioned.

(Viscosity of Curable Resin Composition)

The viscosity of the curable resin composition to be employed for a process for producing a transparent laminate of the present invention, is such that the viscosity $V_{40}$ at 40° C. is preferably at most 50 Pa·s, and the same also applies to the viscosity of the above curable resin composition of the present invention being applicable to other applications. Further, the viscosity $V_{25}$ at 25° C. is preferably at least 0.05 Pa·s.

The viscosity is measured by means of an E type viscometer (RE-85U manufactured by TOKI SANGYO CO., LTD.) Here, when the viscosity of the composition is at most 100 Pa·s, 1°34'×R24 is used as a rotor, and when the viscosity is at least 100 Pa·s, 3°×R9.7 is used as a rotor.

If the viscosity $V_{40}$ exceeds 50 Pa·s, the flowability deteriorates, bubbles which hardly disappear, tend to be formed in the curable resin composition even when the curable resin composition is employed for the vacuum lamination method as mentioned below. However, when the curable resin composition is employed in applications in which a solvent can be used, it is possible to increase the flowability by blending a solvent so as carry out e.g. coating, and then remove the solvent and cure a curable resin composition obtainable. In order that $V_{25}$ of the curable resin composition is less than 0.05 Pa·s, a large amount of a low-molecular weight monomer is usually required, and therefore the physical properties of the cured product tend to be deteriorated. Further, such a low-molecular weight monomer usually has a low boiling point, and therefore it tends to be difficult to use the curable resin composition for the vacuum lamination method as mentioned below.

The above-mentioned curable resin composition of the present invention, which is to be used in a process for producing a transparent laminate, contains the specific unsaturated urethane oligomer (A) obtained by using the above-mentioned specific polymer component (A1) and the specific monomer (B), and therefore when the composition is cured, a cured product having good transparency and excellent adhesion to a transparent substrate and tear resistance can be obtained.

<Transparent Laminate>

The transparent laminate of the present invention comprises a pair of transparent substrates and a layer of a cured resin interposed between the pair of transparent substrates.

As the transparent substrates, a glass plate or a resin plate may be mentioned. When the glass plate is used, it is possible to obtain a laminated glass. When a polycarbonate plate is used as the resin plate, it is possible to obtain a transparent panel having a high shock resistance and being light in weight. Further, the glass plate and the resin plate may be used in combination.

The size of the transparent substrate is at particularly limited, but in the case of a transparent substrate with a size having at least one side being 300 mm or longer, preferably 600 mm or longer, the transparent substrate is widely useful as a transparent member to be disposed in opening portions for construction or vehicles. The size of the transparent substrate is suitably at most 4 m² in usual applications.

The layer of a cured resin is a layer made of a cured product of the curable resin composition of the present invention.

The thickness of the layer of a cured resin is preferably from 0.2 to 4.0 mm. When the thickness of the layer of a cured resin is at least 0.2 mm, the mechanical strength of the transparent laminate will be good.

In the above-mentioned transparent laminate of the present invention, the layer of a cured resin interposed between the transparent substrates is made of a cured product of the curable resin composition of the present invention, therefore the transparent laminate of the present invention has good the transparency, excellent adhesion between the transparent substrates and the layer of a cured resin, and excellent tear resistance or impact absorption of the layer of a cured resin.

<Process for Producing Transparent Laminate>

The transparent laminate of the present invention can be produced by a known production process (such as a method of interposing a curable resin composition between a pair of transparent substrates, and curing the curable resin composition), and it is preferred that the transparent laminate is produced by a production process by means of a vacuum lamination method. The vacuum lamination method itself is disclosed in WO08/081,838 or WO09/016,943.

The feature of the vacuum lamination method is such that a layer of a curable resin composition is formed on one transparent substrate, and the other transparent substrate is laminated on the layer of the curable resin composition under reduced pressure atmosphere and the curable resin composition is sealed between a pair of the transparent substrates, and thereafter the curable resin composition is cured in an atmosphere having a pressure (usually atmospheric pressure) higher than the above reduced pressure atmosphere. Accordingly, the process for producing a transparent laminate of the present invention essentially comprises the following first step and second step.

First step: A step of forming a sealed space having a curable resin composition internally accommodated between a pair of transparent substrates in a reduced pressure atmosphere, to produce a laminate precursor having the pair of transparent substrates and the above curable resin composition sealed between the pair of transparent substrates.

Second step: A step of placing the above laminate precursor in an atmosphere having a pressure higher than the reduced pressure atmosphere, and curing the curable resin composition in the atmosphere.

The reduced pressure atmosphere in the first step is preferably an atmosphere having a pressure of at most 1 kPa, more preferably an atmosphere having a pressure of at most 100 Pa. Further, if the pressure of the reduced pressure atmosphere is too low, components in the curable resin composition such as the monomer are likely to volatilize, and therefore the reduced pressure atmosphere is preferably an atmosphere having a pressure of at least 1 Pa, more preferably an atmosphere having a pressure of at least 10 Pa.

In the second step, the atmosphere having a pressure higher than the reduced pressure atmosphere is preferably an atmosphere having a pressure of at least 50 kPa, more preferably an atmosphere having a pressure of at least 100 kPa. The atmosphere in the second step is usually an atmosphere having an atmospheric pressure. Hereinafter, this production process will be described with reference to a case where an atmosphere having a pressure higher than the reduced pressure atmosphere is an atmosphere having an atmospheric pressure.

In the first step, even when bubbles remain in the curable resin composition in the sealed space, the bubbles readily disappear before the curable resin composition is cured, and therefore a layer of a cured resin with no bubbles can readily be obtained. When the laminate precursor formed in the first step is placed under atmospheric pressure, a pressure is exerted on the curable resin composition in the sealed space by the pressure exerted from the transparent substrates under atmospheric pressure. On the other hand, the inside of the bubbles in the curable resin composition is under a pressure of the reduced pressure atmosphere of the first step, therefore in the second step, the volume of the bubbles is reduced by the pressure exerted on the curable resin composition, and further air in the bubbles is dissolved in the curable resin composition, whereby the bubbles disappear. In order to let the bubbles disappear, it is preferred that the laminate precursor is retained under atmospheric pressure for a while, before the curable resin composition is cured. The retention time is preferably at least 5 minutes, but in a case where no bubbles are present or a case where bubbles are so fine bubbles as to rapidly disappear, the retention time may be shorter.

In the first step, the reduced pressure atmosphere is needed in the step of forming a sealed space, and such atmosphere is not need in the previous steps. For example, in the case of providing a sealing member having a prescribed thickness around the entire periphery of one surface of one transparent substrate, and supplying a curable resin composition on the surface of the transparent substrate surrounded by the sealing member to form a layer of the curable resin composition, such steps can be carried out under atmospheric pressure. It is preferred that the formation of the sealed space is carried out as follows.

The resulting transparent substrate having a layer of a curable resin composition and the other transparent substrate are put in a reduced pressure chamber, and placed at predetermined positions. That is, the transparent substrate having a layer of a curable resin composition is placed on a horizontal platen so that the layer of a curable resin composition faces upward, the other transparent substrate is mounded on the bottom surface of another horizontal platen mounded at the tip of a cylinder which moves up and down, and both the transparent substrates are positioned in parallel so that the layer of a curable resin composition will not be in contact with the other transparent substrate. Then, the reduced pressure chamber is closed and evacuated of air so that the interior of the reduced pressure chamber would be under a prescribed reduced pressure atmosphere. After the interior of the reduced pressure chamber is under the predetermined reduced pressure atmosphere, the cylinder is operated to laminate both the transparent substrates via the layer of a curable resin composition so that the curable resin composition is sealed in the space surrounded by both the transparent substrates and the sealing member, whereby a laminate precursor is formed. After the laminate precursor is formed, the interior of the reduced pressure chamber is returned to the atmosphere having an atmospheric pressure, and the laminate precursor is taken out from the reduced pressure chamber.

The adhesion strength between both the transparent substrates and the sealing member should be such an extent that air does not enter from the interface between the transparent substrates and the sealing member when the laminate precursor is placed under atmospheric pressure. For example, a layer of a pressure sensitive adhesive may be provided on the surface of the sealing member to adhere the sealing member with the transparent substrate. Further, if necessary, a curable adhesive is provided on the interface between the transparent substrate and the sealing member, or the sealing member is formed from a curable resin, whereby a laminate precursor is formed, and thereafter such an adhesive or a curable resin is cured in the interior of the reduced pressure chamber or after the laminate precursor is taken out from the reduced pressure chamber, thereby to increase the adhesive strength between the transparent substrate and the sealing member.

The second step is a step of placing the above laminate precursor in an atmospheric pressure and curing the curable resin composition. The curable resin composition is subjected to thermosetting in a case where the curable resin composition is a thermosetting curable resin. More preferably, a photocurable resin composition is used as the curable resin composition and photocured. The photocuring may be carried out by irradiation with light emitted from a light source such as a ultraviolet lamp through the transparent substrate. As mentioned above, it is preferred that the laminate precursor is retained under atmospheric pressure for a while, and then the curable resin composition is cured. By curing the curable resin composition, the curable resin composition is formed into a cured resin, whereby a transparent laminate as mentioned above can be obtained.

EXAMPLES

Now, the present invention will be described in further detail with reference to Examples. However, it should be understood that the present invention is by no means restricted to such specific Examples.

Examples 1 to 10 are Examples of the present invention, and Examples 11 to 14 are Comparative Examples.

(Haze Value)

As an evaluation of the transparency at a portion where a layer of a cured resin is present in a transparent laminate, a haze value was measured. The haze value was measured in accordance with ASTM D1003 by using Haze-guard II (manufactured by Toyo Seiki Seisaku-sho, Ltd.).

(Adhesion)

A part of one transparent substrate in the transparent laminate was removed to expose the layer of a cured resin, and the layer of a cured resin having a length of 30 mm×a width of 10 mm adhered to the other transparent substrate was used as a test specimen, and the adhesion strength at the time of peeling off the test specimen from the transparent substrate while a length of 10 mm of the test specimen was left, was measured by using a bond tester (SS-15 KP, manufactured by SESHIN CORPORATION) as a tester, under conditions of measurement temperature: 25° C., relative humidity: 50%, distance between marked lines: 20 mm, and pulling speed: 50 mm/min.

(Tear Resistance)

A part of one transparent substrate of the transparent laminate was removed to expose the layer of a curable resin, and a part (a size of approximately 10 mm×30 mm) of the layer of a cured resin was peeled off from the other transparent substrate to prepare a test specimen. The test specimen was torn from an about 1 mm-cut line imparted at an almost center portion of the longer side of the test specimen obtained, by using a bond tester (SS-15 KP, manufactured by SESHIN CORPORATION) under conditions of measurement temperature: 25° C., relative humidity: 50%, distance between marked lines: 20 mm and pulling speed: 50 mm/min, to measure a resistance when the resin is broken by the stress from above and below, as a strength.

Further, as an index of flexibility, distortion at break (hereafter referred to as break distortion) was measured.

(Viscosity)

The viscosity $V_{25}$ at 25° C. of the curable composition was measured by means of an E type viscometer (RE-85U, manufactured by TOKI SANGYO CO., LTD). Here, when the viscosity of the composition was at most 100 Pa·s, 1°34'×R24 was used as a rotor, and when the viscosity was at least 100 Pa·s, 3°×R9.7 was used as a rotor.

(Polyol (b-1))

In the presence of a zinc hexacyanocobaltate-glyme complex as a catalyst, propylene oxide was reacted with an initiator to deactivate the catalyst, and then in the presence of potassium hydroxide as a catalyst, ethylene oxide was reacted therewith. The catalyst was deactivated, and then purification was carried out to obtain a polyoxyalkylene polyol (polyol (b-1)) shown in Table 1.

(Polyol (b-2))

In the presence of a zinc hexacyanocobaltate-glyme complex as a catalyst, propylene oxide was reacted with an initiator to deactivate the catalyst, and then in the presence of potassium hydroxide as a catalyst, ethylene oxide was reacted therewith. The catalyst was deactivated, and then purification was carried out to obtain a polyoxyalkylene polyol (polyol (b-2)) shown in Table 1.

(Polyol (b-3))

In the presence of a zinc hexacyanocobaltate-glyme complex as a catalyst, propylene oxide was reacted with an initiator to deactivate the catalyst, and then in the presence of potassium hydroxide as a catalyst, ethylene oxide was reacted therewith. The catalyst was deactivated, and then purification was carried out to obtain a polyoxyalkylene polyol (polyol (b-3)) shown in Table 1.

(Polyol (b-4))

In the presence of a zinc hexacyanocobaltate-tert-butyl alcohol complex as a catalyst, propylene oxide was reacted with an initiator to deactivate the catalyst, and then purification was carried out to obtain a polyoxyalkylene polyol (polyol (b-4)) shown in Table 1.

(Polyol (b-5))

In the presence of a zinc hexacyanocobaltate-tert-butyl alcohol complex as a catalyst, propylene oxide was reacted with an initiator to deactivate the catalyst, and then purification was carried out to obtain a polyoxyalkylene polyol (polyol (b-5)) shown in Table 1.

(Polyol (b-6))

In the presence of a zinc hexacyanocobaltate-tert-butyl alcohol complex as a catalyst, propylene oxide was reacted with an initiator to deactivate the catalyst, and then purification was carried out to obtain a polyoxyalkylene polyol (polyol (b-6)) shown in Table 1.

(Polyol (b-7))

In the presence of a zinc hexacyanocobaltate-tert-butyl alcohol complex as a catalyst, propylene oxide was reacted with an initiator to deactivate the catalyst, and then purification was carried out to obtain a polyoxyalkylene polyol (polyol (b-7)) shown in Table 1.

TABLE 1

| Polyol (a1) | Number of hydroxy groups (Number) | Hydroxy value (KOH mg/g) | USV | Oxyethylene group content (mass %) |
|---|---|---|---|---|
| Polyol (b-1) | 2 | 28 | 0.016 | 24 |
| Polyol (b-2) | 3 | 17 | 0.023 | 12 |
| Polyol (b-3) | 2 | 28 | 0.021 | 8 |
| Polyol (b-4) | 2 | 7.7 | 0.007 | 0 |
| Polyol (b-5) | 3 | 11 | 0.008 | 0 |
| Polyol (b-6) | 3 | 34 | 0.006 | 0 |
| Polyol (b-7) | 2 | 56 | 0.006 | 0 |

(Polyol Components (c-1) to (c-7))

As shown in Table 1, the polyols (b-1) to (b-7) were used alone to prepare polyol components (c-1) to (c-7) respectively. That is, for example, the polyol component (c-1) is composed solely of the polyol (b-1), the polyol component (c-2) is composed solely of the polyol (b-2), and the polyol component (c-3) is composed solely of the polyol (b-3).

Example 1

To 100 parts by mass (0.05 mol) of the polyol component (c-1), 7.5 parts by mass (0.065 mol) of isophorone diisocyanate (hereinafter referred to as IPDI) was added, and they were reacted at 80° C. for 4 hours in the presence of 0.01 part by mass of dibutyltin dilaurate (hereinafter referred to as "DBTDL") to obtain a urethane prepolymer. To the urethane prepolymer, 0.05 part by mass of DBTDL and 0.05 part by mass of hydroquinone monomethyl ether (hereinafter referred to as "HQME") were added, 2.0 parts by mass (0.03 mol) of 2-hydroxyethyl acrylate (hereinafter referred to as "HEA") was added thereto at 50° C., and they were stirred at 60° C. to carry out reaction until isocyanate groups disappeared while the content of the isocyanate group was measured by means of NCO titration in accordance with JIS K1603-1 to obtain a urethane acrylate oligomer (oligomer (e-1)) shown in Table 2.

40 Parts by mass of the oligomer (e-1), 40 parts by mass of 2-hydroxybutyl methacrylate (hereinafter referred to as "HBMA") and 20 parts by mass of n-dodecyl methacrylate (hereinafter referred to as "DMA") were mixed, and 1 part by mass of 1-hydroxycyclohexyl phenyl ketone (hereinafter referred to as "HCHPK") was added thereto to prepare a photocurable resin composition.

Example 2

To 100 parts by mass (0.05 mol) of the polyol component (c-1), 11.3 parts by mass (0.1 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, 6.0 parts by mass (0.1 mol) of HEA was added at 50° C., and they were stirred at 60° C. to carry out reaction until isocyanate groups disappeared while the content of the isocyanate group was measured by means of NCO titration in accordance with JIS K1603-1 to obtain a urethane acrylate oligomer (oligomer (e-2)) shown in Table 2.

40 Parts by mass of the oligomer (e-2), 40 parts by mass of HBMA and 20 parts by mass of DMA were mixed, and 1 part by mass of HCHPK was added thereto to prepare a photocurable resin composition.

Example 3

To 100 parts by mass (0.05 mol) of the polyol component (c-1), 6.8 parts by mass (0.06 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, and 1.2 parts by mass (0.02 mol) of HEA was added thereto at 50° C., and they were stirred at 60° C. to carry out reaction until isocyanate groups disappeared while the content of the isocyanate group was measured by means of NCO titration in accordance with JIS K1603-1, to obtain a urethane acrylate oligomer (oligomer (e-3)) shown in Table 2.

40 Parts by mass of the oligomer (e-3), 40 parts by mass of HBMA and 20 parts by mass of DMA were mixed, and 1 part by mass of HCHPK was added thereto to prepare a photocurable resin composition.

Example 4

To 100 parts by mass (0.05 mol) of the polyol component (c-2), 6.7 parts by mass (0.1 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, 3.5 parts by mass (0.1 mol) of HEA was added thereto at 50° C., and they were stirred at 60° C. to carry out reaction until isocyanate groups disappeared while the content of the isocyanate group was measured by means of NCO titration in accordance with JIS K1603-1, to obtain a urethane acrylate oligomer (oligomer (e-4)) shown in Table 2.

40 Parts by mass of the oligomer (e-4), 40 parts by mass of HBMA and 20 parts by mass of DMA were mixed, and 1 part by mass of HCHPK was added thereto to prepare a photocurable resin composition.

Example 5

To 100 parts by mass (0.05 mol) of the polyol component (c-3), 7.5 parts by mass (0.065 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, 2.0 parts by mass (0.03 mol) of HEA was added thereto at 50° C., and they were stirred at 60° C. to carry out reaction until isocyanate groups disappeared while the content of the isocyanate group was measured by means of NCO titration in accordance with JIS K1603-1, to obtain a urethane acrylate oligomer (oligomer (e-5)) shown in Table 2.

40 Parts by mass of the oligomer (e-5), 40 parts by mass of HBMA and 20 parts by mass of DMA were mixed, and 1 part by mass of HCHPK was added thereto to prepare a photocurable resin composition.

Example 6

30 Parts by mass of the oligomer (e-1), 30 parts by mass of HBMA and 40 parts by mass of DMA were mixed, and 1 part by mass of HCHPK was added thereto to prepare a photocurable resin composition.

Example 7

30 Parts by mass of the oligomer (e-1), 50 parts by mass of HBMA and 20 parts by mass of DMA were mixed, and 1 part by mass of HCHPK was added to prepare a photocurable resin composition.

Example 8

60 Parts by mass of the oligomer (e-1), 35 parts by mass of HBMA and 5 parts by mass of DMA were mixed, and 1 part by mass of HCHPK was added to prepare a photocurable resin composition.

Example 9

To 100 parts by mass (0.05 mol) of the polyol component (c-1), 5.2 parts by mass (0.06 mol) of hexamethylene diisocyanate (hereinafter referred to as "HDI") was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, 1.2 parts by mass (0.02 mol) of HEA was added thereto at 50° C., and they were stirred at 60° C. to carry out reaction until isocyanate groups disappeared while the content of the isocyanate group was measured by means of NCO titration in accordance with JIS K1603-1 to obtain a urethane acrylate oligomer (oligomer (e-6)) shown in Table 2.

40 Parts by mass of the oligomer (e-6), 40 parts by mass of HBMA and 20 parts by mass of DMA were mixed, and 1 part by mass of HCHPK was added thereto to prepare a photocurable resin composition.

Example 10

40 Parts by mass of the oligomer (e-1), 40 parts by mass of 2-hydroxypropyl methacrylate (hereinafter referred to as "HPMA") and 20 parts by mass of DMA were mixed, and 1 part by mass of HCHPK was added thereto to prepare a photocurable resin composition.

Example 11

To 100 parts by mass (0.05 mol) of the polyol component (c-4), 11 parts by mass (0.065 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, and 5.8 parts by mass (0.03 mol) of HEA was added thereto at 50° C., and they were stirred at 60° C. to carry out reaction until isocyanate groups disappeared while the content of the isocyanate group was measured by means of NCO titration in accordance with JIS K1603-1 to obtain a urethane acrylate oligomer (oligomer (e-7)) shown in Table 2.

40 Parts by mass of the oligomer (e-7), 40 parts by mass of HBMA and 20 parts by mass of DMA were mixed, and 1 part by mass of HCHPK was added thereto to prepare a photocurable resin composition.

Example 12

To 100 parts by mass (0.05 mol) of the polyol component (c-5), 3.0 parts by mass (0.1 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, and 1.6 parts by mass (0.1 mol) of HEA was added thereto at 50° C., and they were stirred at 60° C. to carry out reaction until isocyanate groups disappeared while the content of the isocyanate group was measured by means of NCO titration in accordance with JIS K1603-1 to obtain a urethane acrylate oligomer (oligomer (e-8)) shown in Table 2.

40 Parts by mass of the oligomer (e-8), 40 parts by mass of HBMA and 20 parts by mass of DMA were mixed, and 1 part by mass of HCHPK was added thereto to prepare a photocurable resin composition.

Example 13

To 100 parts by mass (0.05 mol) of the polyol component (c-6), 4.3 parts by mass (0.1 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, 2.3 parts by mass (0.1 mol) of HEA was added thereto at 50° C., and they were stirred at 60° C. to carry out reaction until isocyanate groups disappeared while the content of the isocyanate group was measured by means of NCO titration in accordance with JIS K1603-1 to obtain a urethane acrylate oligomer (oligomer (e-9)) shown in Table 2.

40 Parts by mass of the oligomer (e-9), 40 parts by mass of HBMA and 20 parts by mass of DMA were mixed, and 1 part by mass of HCHPK was added thereto to prepare a photocurable resin composition.

Example 14

To 100 parts by mass (0.05 mol) of the polyol component (c-7), 13.5 parts by mass (0.1 mol) of IPDI was added, and they were reacted at 80° C. for 4 hours in the presence of 0.01 part by mass of DBTDL to obtain a urethane prepolymer. To the urethane prepolymer, 0.05 part by mass of DBTDL and 0.05 part by mass of HQME were added, 7.2 parts by mass (0.1 mol) of HEA was added thereto at 50° C., and they were stirred at 60° C. to carry out reaction until isocyanate groups disappeared while the content of the isocyanate group was measured by means of NCO titration in accordance with JIS K1603-1 to obtain a urethane acrylate oligomer (oligomer (e-10)) shown in Table 2.

40 Parts by mass of the oligomer (e-10), 40 parts by mass of HBMA and 20 parts by mass of DMA were mixed, and 1 part by mass of HCHPK was added thereto to prepare a photocurable resin composition.

TABLE 2

| Oligomer | | (e-1) | (e-2) | (e-3) | (e-4) | (e-5) | (e-6) | (e-7) | (e-8) | (e-9) | (e-10) |
|---|---|---|---|---|---|---|---|---|---|---|---|
| Polyol | | (c-1) | (c-1) | (c-1) | (c-2) | (c-3) | (c-1) | (c-4) | (c-5) | (c-6) | (c-7) |
| component | (mass %) | 100 | 100 | 100 | 100 | 100 | 100 | 100 | 100 | 100 | 100 |
| Polyisocyanate | | IPDI | IPDI | IPDI | IPDI | IPDI | IPDI | IPDI | IPDI | IPDI | IPDI |
| | (mass %) | 7.5 | 11.3 | 6.8 | 6.7 | 7.5 | 5.2 | 11 | 3 | 4.3 | 13.5 |
| Unsaturated | | HEA | HEA | HEA | HEA | HEA | HEA | HEA | HEA | HEA | HEA |
| hydroxy | (mass %) | 2 | 6 | 1.2 | 3.5 | 2 | 1.2 | 5.8 | 1.6 | 2.3 | 7.2 |
| compound | | | | | | | | | | | |
| Urethane- | | DBTDL | DBTDL | DBTDL | DBTDL | DBTDL | DBTDL | DBTDL | DBTDL | DBTDL | DBTDL |
| forming | (mass %) | 0.01 | 0.01 | 0.01 | 0.01 | 0.01 | 0.01 | 0.01 | 0.01 | 0.01 | 0.01 |
| catalyst | | | | | | | | | | | |
| Polymerization | | HQME | HQME | HQME | HQME | HQME | HQME | HQME | HQME | HQME | HQME |
| inhibitor | (mass %) | 0.05 | 0.05 | 0.05 | 0.05 | 0.05 | 0.05 | 0.05 | 0.05 | 0.05 | 0.05 |

(Production of Laminate)

Laminate glasses (transparent laminates) were produced by employing the respective curable resin compositions obtained in Examples 1 to 14. A production process thereof will be described with reference to FIG. 1.

Each curable resin composition was accommodated in a reduced pressure chamber in an open state while it was kept in a container, and the pressure in the interior of the reduced pressure chamber was reduced to about 200 Pa·s and held for 10 minutes to carry out bubble-removal treatment, before use.

As transparent substrates, two sheets of soda lime glass with a length of 610 mm, a width of 610 mm and a thickness of 2 mm were prepared. A double sided adhesive tape (sealing member) with a thickness of 1 mm and a width of 10 mm was adhered along edge portions of four sides of one transparent substrate, and then a release film on the upper surface of the double sided adhesive tape was removed.

An ultraviolet curable resin for sealing prepared by uniformly mixing 100 parts by mass of a urethane acrylate oligomer (UF8001G, manufactured by KYOEISHA Chemical Co., Ltd.) and 1 part by mass of benzoin isopropyl ether (polymerization initiator) in advance, was applied on the upper surface of the above double sided adhesive tape by a dispenser in a coating thickness of about 0.3 mm, to form a layer of the ultraviolet curable resin for sealing.

In an area surrounded by the double sided adhesive tape, on the surface of the transparent substrate to which the double sided adhesive tape was adhered, the curable resin composition was dropped at a plurality of portions by using a dispenser so that the total mass would be 380 g.

Figure 1:
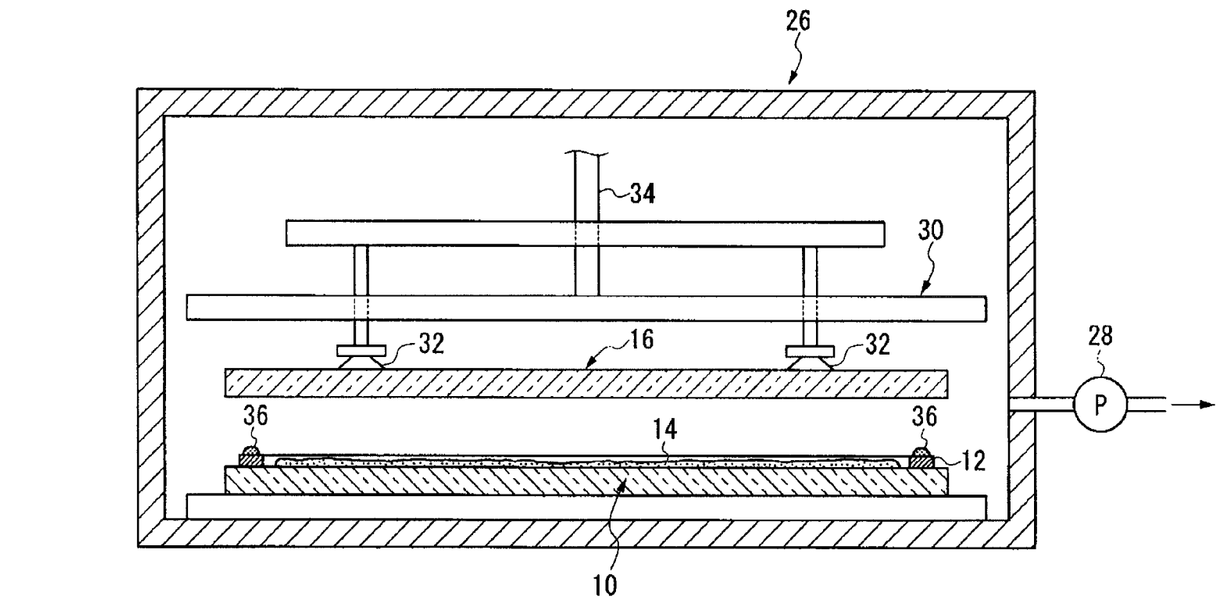
FIG. 1 is a cross-sectional view illustrating one step in production of a transparent laminate.

As showing in Table 1, the transparent substrate 10 having the curable resin composition 14 dropped in the area surrounded by the double sided adhesive tape 12 (sealing member), was placed horizontally in the reduced pressure chamber 26.

The other transparent substrate 16 was held on an upper platen 30 in the reduced pressure chamber 26 by using suction pads 32, and held so as to face the transparent substrate 10 in parallel, and so that the distance from the transparent substrate 10 would be 10 mm.

The reduced pressure chamber 26 was closed, and a vacuum pump 28 was operated to evacuate the interior of the reduced pressure chamber 26 of air to be about 30 Pa. At that time, the bubbling of the curable resin composition 14 was not continued.

The upper platen 30 was lifted down by a cylinder 34, and the transparent substrate 10 and the transparent substrate 16 were press-bonded under pressure of 2 kPa and held for 1 minute.

The pressure in the interior of the reduced pressure chamber 26 was returned to atmospheric pressure in about 30 seconds thereby to obtain a laminate precursor having the transparent substrate 10 and the transparent substrate 16 bonded via an uncured layer of the curable resin composition 14.

The upper platen 30 was lifted up by the cylinder 34, and the laminate precursor sucked by the suction pads 32 of the upper platen 30, was released from the upper platen 30.

A portion where the double sided adhesive tape 12 was present along the periphery of the laminate precursor was irradiated with UV rays emitted from a fiber light source using a high pressure mercury lamp as the light source through the transparent substrate 16, to cure the ultraviolet curable resin 36 for sealing, on the upper surface of the double sided adhesive tape 12. Thereafter, the laminate precursor was kept horizontally and left to stand for about one hour.

From directions of both sides of the laminate precursor, ultraviolet rays having an intensity of 1 mW/cm$^2$ were respectively applied for 10 minutes uniformly by means of high pressure mercury lamps to cure the curable resin composition 14 thereby to obtain a transparent laminate (laminate glass). The evaluation results of the transparent laminate are shown in Tables 3 and 4.

TABLE 3

| | | | Example | | | | | | |
|---|---|---|---|---|---|---|---|---|---|
| | | | 1 | 2 | 3 | 4 | 5 | 6 | 7 |
| Composition | Urethane acrylate | | (e-1) | (e-2) | (e-3) | (e-4) | (e-5) | (e-1) | (e-1) |
| | oligomer (A) | (mass %) | 40 | 40 | 40 | 40 | 40 | 40 | 30 |
| | Monomer (B) | | HBMA | HBMA | HBMA | HBMA | HBMA | HBMA | HBMA |
| | | (mass %) | 40 | 40 | 40 | 40 | 40 | 30 | 50 |
| | Monomer (C) | | DMA | DMA | DMA | DMA | DMA | DMA | DMA |
| | | (mass %) | 20 | 20 | 20 | 20 | 20 | 40 | 20 |
| | Photopolymerization | | HCHPK | HCHPK | HCHPK | HCHPK | HCHPK | HCHPK | HCHPK |
| | initiator (D) | (mass %) | 0.1 | 0.1 | 0.1 | 0.1 | 0.1 | 0.1 | 0.1 |
| Physical property value | Haze value | (%) | <0.1 | 0.5 | <0.1 | 0.5 | 0.6 | 0.4 | 0.2 |
| | Adhesion strength | (N) | 7.5 | 8.0 | 8.6 | 11.7 | 12.1 | 12.7 | 5.2 |
| | Viscosity $V_{25}$ | (mPa·s) | 1200 | 250 | 6300 | 840 | 1000 | 310 | 410 |
| | Tear Strength | ($\times 10^{-2}$ MPa) | 10.8 | 9.8 | 13.4 | 13.2 | 16.9 | 9.8 | 23.9 |
| | resistance Break distortion | (%) | 275 | 143 | 263 | 114 | 126 | 103 | 147 |

TABLE 4

| | | | Example | | | | | | |
|---|---|---|---|---|---|---|---|---|---|
| | | | 8 | 9 | 10 | 11 | 12 | 13 | 14 |
| Composition | Urethane acrylate | | (e-1) | (e-6) | (e-1) | (e-7) | (e-8) | (e-9) | (e-10) |
| | oligomer (A) | (mass %) | 60 | 40 | 40 | 40 | 40 | 40 | 40 |
| | Monomer (B) | | HBMA | HBMA | HPMA | HBMA | HBMA | HBMA | HBMA |
| | | (mass %) | 35 | 40 | 40 | 40 | 40 | 40 | 40 |
| | Monomer (C) | | DMA | DMA | DMA | DMA | DMA | DMA | DMA |
| | | (mass %) | 5 | 20 | 20 | 20 | 20 | 20 | 20 |
| | Photopolymerization | | HCHPK | HCHPK | HCHPK | HCHPK | HCHPK | HCHPK | HCHPK |
| | initiator (D) | (mass %) | 0.1 | 0.1 | 0.1 | 0.1 | 0.1 | 0.1 | 0.1 |
| Physical property value | Haze value | (%) | 0.4 | 0.3 | 0.7 | 2.7 | 1.0 | 0.9 | 0.2 |
| | Adhesion strength | (N) | 7.2 | 7.6 | 12.0 | 3.7 | 7.5 | 6.7 | 7.3 |
| | Viscosity $V_{25}$ | (mPa·s) | 8110 | 21700 | 1150 | 1330 | 2100 | 550 | 150 |
| | Tear Strength | ($\times 10^{-2}$ MPa) | 12.4 | 13.0 | 24.1 | 16.3 | 16.4 | 18.1 | 15.2 |
| | resistance Break distortion | (%) | 137 | 270 | 157 | 227 | 111 | 69 | 74 |

A transparent laminate was obtained in the same manner as in Examples 1 to 14, except that DMA was replaced by n-octadecyl methacrylate. The same results as in the results shown in Tables 3 and 4 were obtained.

As shown in the results of Tables 3 and 4, the haze value was low, and a transparent laminate was obtained in each of Examples 1 to 10. Further, in comparison of the adhesion to the transparent substrate and the tear strength, which are required for the laminate glass, a low haze and excellent performances in adhesion to the transparent substrate and tear resistance were achieved in Examples of the present invention, regardless of the hydroxy value of the polyol (a1), and a transparent laminate suitable for laminated glass was obtained.

On the other hand, in each of Examples 11 to 13 as Comparative Examples, the haze is high, and therefore the transparent laminate cannot be used as laminated glass. Further, in each of Examples 13 and 14, the break distortion is low and the flexibility is thereby poor, and therefore the curable resin composition cannot be used as a curable resin composition for laminated glass.

INDUSTRIAL APPLICABILITY

The curable resin composition of the present invention is useful as a material for an adhesive resin layer for laminated glass, and the transparent laminate of the present invention is useful for laminated glass (such as windshield glass, safety glass or security glass), for displays or for solar cells.

This application is a continuation of PCT Application No. PCT/JP2010/058460, filed May 19, 2010, which is based upon and claims the benefit of priority from Japanese Patent Application No. 2009-122194 filed on May 20, 2009. The contents of those applications are incorporated herein by reference in its entirety.

REFERENCE SYMBOLS

| | |
|---|---|
| 10: | Transparent substrate |
| 12: | Double sided adhesive tape |
| 14: | Curable resin composition |
| 16: | Transparent substrate |
| 26: | Reduced pressure chamber |
| 28: | Vacuum pump |
| 30: | Upper platen |
| 32: | Suction pad |
| 34: | Cylinder |
| 36: | Ultraviolet curable resin for sealing |

What is claimed is:

1. A curable resin composition comprising:
   unsaturated urethane oligomer (A): an unsaturated urethane oligomer having from 2 to 3 curable functional groups as mentioned below, on average per molecule, which is a reaction product of the following polyol component (A1), a polyisocyanate (A2) and the following unsaturated hydroxy compound (A3), or a reaction product of the following polyol component (A1) and an unsaturated isocyanate (A4) having the following curable functional group,
   polyol component (A1): a polyol component comprising the following polyol (a1),
   polyol (a1): a polyoxyalkylene polyol having a hydroxy value of from 15 to 30 mgKOH/g and an oxyethylene group content of from 8 to 50 mass % in the total oxyalkylene groups of 100 mass %, which is obtained by reacting a monoepoxide having at least three carbon atoms and ethylene oxide with an initiator having from 2 to 4 active hydrogen atoms on average,
   unsaturated hydroxy compound (A3): a compound having the following curable functional group and a hydroxy group, and
   curable functional group: a group represented by $CH_2=C(R)C(O)O$— wherein R is a hydrogen atom or a methyl group,
   monomer (B): a compound represented by $CH_2=C(R)C(O)O$—$R^2$, wherein R is a hydrogen atom or a methyl group, and $R^2$ is a $C_{3-8}$ hydroxyalkyl group having from 1 to 2 hydroxy groups and
   monomer (C): a compound represented by $CH_2=C(R)C(O)O$—$R^3$, wherein R is a hydrogen atom or a methyl group, and $R^3$ is a $C_{8-22}$ alkyl group.

2. The curable resin composition according to claim 1, wherein the polyol (a1) is a polyoxyalkylene polyol having a hydroxy value of from 15 to 30 mgKOH/g and an oxyethylene group content of from 8 to 50 mass % in the total oxyalkylene groups of 100 mass %, which is obtained by reacting propylene oxide and ethylene oxide with an initiator having from 2 to 4 active hydrogen atoms on average.

3. The curable resin composition according to claim 1, wherein a laminate produced by curing the curable resin composition interposed between a pair of transparent substrates is transparent.

4. The curable resin composition according to claim 3, which further comprises a photopolymerization initiator (D).

5. A transparent laminate comprising a pair of transparent substrates and a layer of a cured resin interposed between the pair of transparent substrates, wherein the cured resin is a cured product of the curable resin composition as defined in claim 3.

6. A process for producing a transparent laminate, comprising a first step of forming a sealed space having the curable resin composition as defined in claim 3, internally accommodated between a pair of transparent substrates in a reduced pressure atmosphere, to produce a laminate precursor having the pair of transparent substrates and the above curable resin composition sealed between the pair of transparent substrates, and a second step of placing the above laminate precursor in an atmosphere having a pressure higher than the reduced pressure atmosphere, and curing the curable resin composition in the atmosphere.

7. The process according to claim 6, wherein the above reduced pressure atmosphere is a pressure atmosphere of at most 100 Pa, and the atmosphere having a pressure higher than the reduced pressure atmosphere is an atmospheric pressure atmosphere.

8. The process according to claim 6, wherein the curable resin composition is a photocurable resin composition, and the curable resin composition is cured by irradiating the laminate precursor with light in the second step.

9. The curable resin composition according to claim 1, wherein a proportion of oligomer (A) is 20 to 75 mass % per 100 mass % of said curable resin composition.

10. The curable resin composition according to claim 1, wherein a proportion of monomer (B) is 25 to 65 mass % per 100 mass % of said curable resin composition.

11. The curable resin composition according to claim 1, wherein a proportion of monomer (B) is 35 to 50 mass % per 100 mass % of said curable resin composition.

12. The curable resin composition according to claim 1, wherein a proportion of monomer (C) is 3 to 50 mass % per 100 mass % of said curable resin composition.

13. The curable resin composition according to claim 1, wherein monomer (B) is at least one monomer selected from the group consisting of 2-hydroxypropyl methacrylate, 2-hydroxybutyl methacrylate, 4-hydroxybutyl methacrylate and 6-hydroxyhexyl methacrylate.

14. The curable resin composition according to claim 1, wherein monomer (C) is at least one monomer selected from the group consisting of n-dodecyl methacrylate, n-octadecyl methacrylate and n-behenyl methacrylate.

15. The curable resin composition according to claim 1, wherein polyol component (A1) further comprise a polyol (a2): a polyoxyalkylene polyol having no oxyethylene groups.

16. The curable resin composition according to claim 1, wherein polyol component (A1) further comprise a polyol (a2): a polyoxyelkylene polyol having at least 5 hydroxy groups, on average.

17. The curable resin composition according to claim 1, wherein polyol component (A1) further comprise a polyol (a2): a polyoxyalkylene polyol having a hydroxyl value exceeding 30 mg KOH/g.

18. The curable resin composition according to claim 1, wherein said polyisocyanate (A2) is not an aromatic polyisocyanate having isocyanate groups bonded to an aromatic ring.

\* \* \* \* \*